US012725802B2

(12) United States Patent
Kang et al.

(10) Patent No.: US 12,725,802 B2
(45) Date of Patent: Sep. 1, 2026

(54) AQUEOUS RECHARGEABLE BATTERY INCLUDING ORGANIC POSITIVE ACTIVE MATERIAL

(71) Applicant: Seoul National University R&DB Foundation, Seoul (KR)

(72) Inventors: Kisuk Kang, Seoul (KR); Myeong Hwan Lee, Sokcho-si (KR); Giyun Kwon, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 833 days.

(21) Appl. No.: 17/934,561

(22) Filed: Sep. 22, 2022

(65) Prior Publication Data

US 2023/0134472 A1 May 4, 2023

(30) Foreign Application Priority Data

Nov. 2, 2021 (KR) ........................ 10-2021-0148940

(51) Int. Cl.
*H01M 4/60* (2006.01)
*H01M 10/36* (2010.01)
*H01M 50/46* (2021.01)
*H01M 4/02* (2006.01)

(52) U.S. Cl.
CPC ............. *H01M 4/60* (2013.01); *H01M 10/36* (2013.01); *H01M 50/46* (2021.01); *H01M 2004/028* (2013.01); *H01M 2300/0005* (2013.01)

(58) Field of Classification Search
CPC ..................................................... H01M 8/188
See application file for complete search history.

(56) References Cited

U.S. PATENT DOCUMENTS

| | | | | |
|---|---|---|---|---|
| 12,057,555 | B2 * | 8/2024 | Wang | H01M 4/48 |
| 2017/0062842 | A1 | 3/2017 | Huang et al. | |
| 2018/0277903 | A1 * | 9/2018 | Xu | H01M 10/0569 |
| 2021/0257675 | A1 | 8/2021 | Kang et al. | |
| 2022/0048869 | A1 | 2/2022 | Lee et al. | |
| 2022/0200034 | A1 * | 6/2022 | Borah | H01M 10/26 |

FOREIGN PATENT DOCUMENTS

| | | | |
|---|---|---|---|
| CN | 113206283 | 8/2021 | |
| JP | 6612238 B2 * | 11/2019 | H01M 4/466 |
| JP | 2020-038818 | 3/2020 | |
| JP | 2020-053384 | 4/2020 | |
| KR | 10-2018-0079881 | 7/2018 | |
| KR | 10-2020-0065479 | 6/2020 | |
| KR | 10-2021-0056781 | 5/2021 | |
| KR | 10-2021-0103749 | 8/2021 | |
| WO | WO-2020130857 A1 * | 6/2020 | H01M 10/26 |

OTHER PUBLICATIONS

Machine translation of CN113206283A from Espacenet. (Year: 2021).*

Sechan Lee, et al., "Utilizing Latent Multi-Redox Activity of p-Type Organic Cathode Materials toward High Energy Density Lithium-Organic Batteries", Adv. Energy Mater. 2020, 10, 2001635, Jul. 12, 2020, DOI: 10.1002/aenm.202001635.

Nam, Kwan Woo, et al., "Redox-Active Phenanthrenequinone Triangles in Aqueous Rechargeable Zinc Batteries", J. Am. Chem. Soc. 2020, 142, 5, 2541-2548, Jan. 2, 2020.

Yang, Wuhai, et al., "Hydrated Eutectic Electrolytes with Ligand-Oriented Solvation Shells for Long-Cycling Zinc-Organic Batteries", Joule, vol. 4, Issue 7, p. 1557-1574, Jul. 15, 2020.

Quan Wang, et al., "Phenazine-based organic cathode for aqueous zinc secondary batteries", Journal of Power Sources, vol. 468, Aug. 31, 2020, 228401, total 7 pages.

* cited by examiner

*Primary Examiner* — Maria Laios
(74) *Attorney, Agent, or Firm* — LEX IP MEISTER, PLLC

(57) ABSTRACT

Provided is an aqueous rechargeable battery that includes a positive electrode including an organic positive active material including a compound represented by Chemical Formula 1, a negative electrode, a separator between the positive electrode and negative electrode, and an aqueous electrolyte including a water solvent and a metal salt with a molality of greater than or equal to about 10 m. Definitions for Chemical Formula 1 are as described in the specification.

18 Claims, 15 Drawing Sheets

AQUEOUS RECHARGEABLE BATTERY INCLUDING ORGANIC POSITIVE ACTIVE MATERIAL

CROSS-REFERENCE TO RELATED APPLICATION

This application claims priority to and the benefit of Korean Patent Application No. 10-2021-0148940 filed in the Korean Intellectual Property Office on Nov. 2, 2021, the entire contents of which are incorporated herein by reference.

BACKGROUND OF THE INVENTION

(a) Field of the Invention

The present disclosure relates to an aqueous rechargeable battery, including an organic positive active material.

(b) Description of the Related Art

Recently, interest in developing eco-friendly energy production technology and energy storage devices to cope with problems such as global warming, environmental pollution, and the like has been increasing. Accordingly, the demand for rechargeable lithium batteries is also increasing. The rechargeable lithium batteries use a lithium transition metal composite compound as a commercially available positive active material. Such a positive active material serves as a factor mostly determining the commercialization cost of the rechargeable lithium batteries and also capacity and performance thereof. However, the lithium transition metal composite compound has recently reached a capacity limit, and lithium and transition metal raw materials have become scarce on earth and inevitably expensive, which act as obstacles to the commercialization of rechargeable batteries and also the commercialization of electric vehicles and large capacity storage devices. Accordingly, since there is currently a shortage of rechargeable batteries, many companies and academia are conducting research and development on new electrode materials capable of solving the problems of the shortage of raw materials for rechargeable batteries and the capacity limit of the positive active material.

Among various post-lithium rechargeable battery candidates, organic-based positive active materials, that is, redox-active organic materials (ROMs), are being spotlighted and researched. These ROMs are mostly composed of elements abundant on earth, such as carbon, hydrogen, oxygen, nitrogen, and sulfur, which are lighter than conventional electrode active materials, may create high theoretical capacity, and in addition, have the flexibility to design by freely changing the elements and thus are recently receiving a lot of attention.

However, the ROMs have high solubility in organic electrolytes, which are commercially available electrolytes for a rechargeable lithium battery (e.g., prepared by dissolving 1 M $LiPF_6$ in ethylene carbonate and dimethyl carbonate), and thus a disadvantage of dissolution and disappearing of active materials during the operation of the rechargeable batteries, which deteriorates the long-term performance of the batteries, many studies are being conducted to solve this problem.

In order to solve the problem according to the solubility of the ROMs, 1) a method of designing an electrode active material to be less soluble in an electrolyte by changing the active material, for example, polymerizing it and the like, 2) a method of encapsulating the electrode active material within a host material to slow dissolution of the active material in contact with the electrolyte, and 3) since the active material is completely prevented from being dissolved in the electrolyte, a method of modifying a separator to prevent organic molecules dissolved in the electrolyte from passing to a counter electrode, and the like have been developed.

However, since each method has many disadvantages, the problem has not yet been solved. 1) When an active material is polymerized, since the molecular weight of the active material is increased, there are disadvantages of reducing theoretical capacity and lowering energy density; in addition, since even the polymerized electrode may be continuously dissolved into an electrolyte, there is still a disadvantage of deteriorating long cycle-life characteristics. 2) The method of encapsulating the active material of organic molecules within a host material may be persuasive. Still, the active material eventually contacts the electrolyte during the operation of a rechargeable battery and finally dissolves in the electrolyte after many cycles, ultimately failing to solve the problem. 3) The method of designing a separator to block the electrode active material has recently been reported. Still, since the electrode active material is dissolved eventually into the electrolyte at a positive electrode and thus reattached to the electrode during the charges and discharges, and resultantly deteriorates cycle-life characteristics, the method may have a disadvantage of being applied only to a battery using specific molecules as an active material. Since the conventional arts fail to completely solving the problem of long cycle-life characteristics, it is still difficult to commercialize a rechargeable battery using the ROMs.

SUMMARY OF THE INVENTION

Provided is an aqueous rechargeable battery, including an organic positive active material, capable of stably driving for a long time without deteriorating capacity while realizing high energy density.

In an embodiment, an aqueous rechargeable battery includes: a positive electrode including an organic positive active material including a compound represented by Chemical Formula 1; a negative electrode; a separator; and an aqueous electrolyte including a water solvent and a metal salt with a molality of greater than or equal to about 10 m.

[Chemical Formula 1]

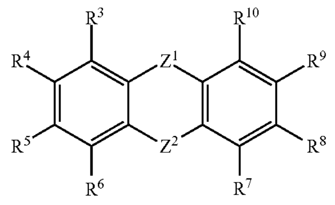

In Chemical Formula 1, $Z^1$ and $Z^2$ are the same as or different from each other, $Z^1$ is $NR^1$, $PR^1$, O, S, S═O, or $S(═O)_2$, and $Z^2$ is $NR^2$, $PR^2$, O, S, S═O, or $S(═O)_2$. Herein, $R^1$ and $R^2$ are the same as or different from each other and are each independently a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, a sulfonyl group, an ester group, a carboxyl group or a salt thereof, a sulfonic acid group or a salt thereof, or a phosphoric acid group or a salt thereof.

$R^3$ to $R^{10}$ are the same as or different from each other and are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, a sulfonyl group, an ester group, a carboxyl group or a salt thereof, a sulfonic acid group or a salt thereof, or a phosphoric acid group or a salt thereof.

According to an embodiment, the aqueous rechargeable battery utilizes an economical and safe organic positive active material by replacing the existing lithium transition metal oxide-based positive active material. Thereby the aqueous rechargeable battery has a very high energy density and suppresses the phenomenon that the organic positive active material is dissolved in the electrolyte and a side-reaction of an electrolyte, realizing high durability and excellent long-term cycle-life characteristics. Such an aqueous rechargeable battery may be applicable to electric vehicles and large-scale energy storage systems (ESSs).

DETAILED DESCRIPTION OF THE EMBODIMENTS

Figure 1:
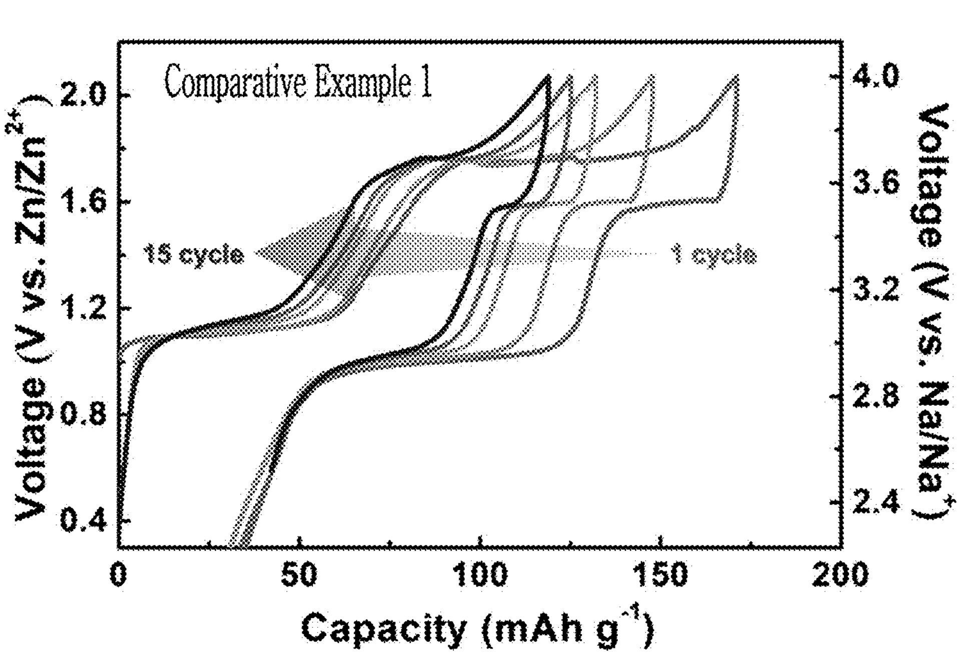
FIG. 1 is a graph illustrating the evaluation of charge/discharge characteristics of a rechargeable battery cell of Comparative Example 1.

Hereinafter, specific embodiments will be described in detail so that those of ordinary skill in the art can easily implement them. However, this disclosure may be embodied in many different forms and is not construed as limited to the example embodiments set forth herein.

The terminology herein is used to describe embodiments only and is not intended to limit the present disclosure. The singular expression includes the plural expression unless the context clearly dictates otherwise.

As used herein, "a combination thereof" refers to a mixture, a laminate, a composite, a copolymer, an alloy, a blend, a reaction product, and the like of constituent elements.

In addition, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

As used herein, "substituted" refers to the replacement of at least one hydrogen by a substituent of a halogen atom (F, Cl, Br, or I), a hydroxy group, C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

In an embodiment, an aqueous rechargeable battery includes a positive electrode including an organic positive active material including a compound represented by Chemical Formula 1, a negative electrode, a separator, and an aqueous electrolyte including a water solvent and a metal salt with a molality of greater than or equal to about 10 m.

[Chemical Formula 1]

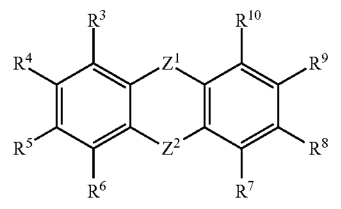

In Chemical Formula 1, $Z^1$ and $Z^2$ are the same as or different from each other, $Z^1$ is $NR^1$, $PR^1$, O, S, S=O, or $S(=O)_2$, and $Z^2$ is $NR^2$, $PR^2$, O, S, S=O, or $S(=O)_2$. Herein, $R^1$ and $R^2$ are the same as or different from each other and are each independently a substituted or unsubstituted C1 to C20 alkyl group, a substituted or unsubstituted C3 to C20 cycloalkyl group, a substituted or unsubstituted C6 to C20 aryl group, a substituted or unsubstituted C1 to C10 alkoxy group, a substituted or unsubstituted C3 to C20 heteroaryl group, a halogen (F, Cl, Br, or I), a hydroxy group, a nitro group, a cyano group, an amine group, an imino group, an azido group, a carbonyl group, a thiol group, an ester group, an ether group, a carboxyl group or a salt thereof, a sulfonic acid group or a salt thereof, or a phosphoric acid group or a salt thereof.

$R^3$ to $R^{10}$ are the same as or different from each other and are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a halogen (F, Cl, Br, or I), a hydroxy group, a nitro group, a cyano group, an amine group, an imino group, an azido group, a carbonyl group, a thiol group, an ester group, an ether group, a carboxyl group or a salt thereof, a sulfonic acid group or a salt thereof, or a phosphoric acid group or a salt thereof.

An aqueous rechargeable battery, according to an embodiment, basically includes a positive electrode including an organic positive active material, a negative electrode including a negative active material, a separator disposed between the positive electrode and the negative electrode, and an aqueous electrolyte including a water solvent and a metal salt. An embodiment relates to an invention that successfully designed an electrolyte suitable for an organic positive active material through the computer deep learning and various experiments. It also relates to an invention in which the phenomenon that the organic positive active material is dissolved in the electrolyte is successfully suppressed, realizing a rechargeable battery that can be stably driven without capacity degradation for a very long time at all rates such as low and high rates while implementing high energy density.

Positive Electrode

The positive electrode may include a current collector and a positive active material layer disposed on the current collector, and the positive active material layer includes an organic positive active material and may further include a binder and a conductive material.

The organic positive active material may be a compound made of carbon and hydrogen and optionally containing elements such as oxygen, nitrogen, sulfur, a halogen, or the like, and may be, for example, a redox-active organic material (ROMs; organic material having redox activity). The organic positive active material may specifically include the compound represented by Chemical Formula 1.

In Chemical Formula 1, for example, $Z^1$ may be $NR^1$, and $Z^2$ may be $NR^2$, $PR^2$, O, S, S=O, or $S(=O)_2$. Alternatively, $Z^1$ may be S and $Z^2$ may be $NR^2$, $PR^2$, O, S, S=O, or $S(=O)_2$. For example, $Z^1$ may be $NR^1$ and $Z^2$ may be $NR^2$; $Z^1$ may be $NR^1$ and $Z^2$ may be S; $Z^1$ may be $NR^1$ and $Z^2$ may be O; or $Z^1$ may be S and $Z^2$ may be S; or $Z^1$ may be S and $Z^2$ may be S=O; or $Z^1$ may be S and $Z^2$ may be $S(=O)_2$.

In the definitions of $R^1$, $R^2$, and $R^3$ to $R^{10}$ of Chemical Formula 1 and Chemical Formula 2 to be described later, the C1 to C20 alkyl group may be, for example, a C1 to C15 alkyl group, a C1 to C10 alkyl group, a C1 to C7 alkyl group, a C1 to C5 alkyl group, or a C1 to C3 alkyl group, and the C3 to C20 cycloalkyl group may be, for example, a C3 to C10 cycloalkyl group, or a C5 to C6 cycloalkyl group. In addition, the C6 to C20 aryl group may be, for example, a C6 to C10 aryl group, the C3 to C20 heteroaryl group may be, for example, a C3 to C10 heteroaryl group, the C1 to C10 alkoxy group may be, for example, a C1 to C5 alkoxy group, or a C1 to C3 alkoxy group, and the C2 to C20 ether group may be, for example, a C2 to C10 ether group, a C2 to C7 ether group, a C2 to C5 ether group, or a C2 to C3 ether group.

In Chemical Formula 1, when $Z^1$ is $NR^1$ or $PR^1$, $R^1$ may be, for example, a halogen-substituted C1 to C10 alkyl group, an unsubstituted C1 to C10 alkyl group, a halogen-substituted C6 to C20 aryl group, an unsubstituted C6 to C20 aryl group, a substituted or unsubstituted C2 to C10 ether group, or a sulfonyl group. Similarly, when $Z^2$ is $NR^2$ or $PR^2$, $R^2$ may be, for example, a halogen-substituted C1 to C10 alkyl group, an unsubstituted C1 to C10 alkyl group, a halogen-substituted C6 to C20 aryl group, an unsubstituted C6 to C20 aryl group, a substituted or unsubstituted C2 to C10 ether group, or a sulfonyl group. The "halogen-substituted" may be, for example, one substituted with a fluorine group, and the "halogen-substituted C1 to C10 alkyl group" may be, for example, trifluoromethyl or trifluoroethyl.

In Chemical Formula 1, $R^3$ to $R^{10}$ may be, for example, independently hydrogen, a substituted or unsubstituted C1 to C20 alkyl group, a substituted or unsubstituted C6 to C20 aryl group, a substituted or unsubstituted C1 to C10 alkoxy group, a halogen (F, Cl, Br, or I), a hydroxy group, a nitro group, a cyano group, an amine group, or a thiol group. The substituted or unsubstituted C1 to C20 alkyl group may be, for example, a halogen-substituted C1 to C10 alkyl group, and for example, a fluorine-substituted C1 to C10 alkyl group.

The compound represented by Chemical Formula 1 may include, for example, a phenazine-based compound, a phenoxazine-based compound, a phenothiazine-based compound, a thianthrene-based compound, and a thianthrene 5-oxide compound, or a thianthrene 5,5-dioxide compound.

The organic positive active material, according to an embodiment, may include, for example, a phenazine-based compound represented by Chemical Formula 2.

[Chemical Formula 2]

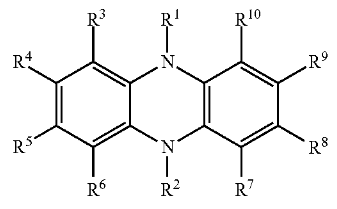

In Chemical Formula 2, $R^1$ and $R^2$ are the same as or different from each other. They are each independently a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, a sulfonyl group, an ester group, a carboxyl group or a salt thereof, a sulfonic acid group or a salt thereof, or a phosphoric acid group or a salt thereof.

In Chemical Formula 2, $R^3$ to $R^{10}$ are the same as or different from each other and are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, a sulfonyl group, an ester group, an ether group, a carboxyl group or a salt thereof, a sulfonic acid group or a salt thereof, or a phosphoric acid group or a salt thereof.

The phenazine-based compound may be a p-type organic material based on an oxidation-reduction of nitrogen and may exhibit an oxidation-reduction potential of approximately 3 V to 4 V and have a high theoretical capacity of approximately 230 to 280 mAh/g. These phenazine-based compounds are expected to realize high energy density among ROMs.

In Chemical Formula 2, for example, $R^1$ and $R^2$ may each independently be a halogen-substituted C1 to C10 alkyl group, an unsubstituted C1 to C10 alkyl group, a halogen-substituted C6 to C20 aryl group, an unsubstituted C6 to C20 aryl group, a substituted or unsubstituted C2 to C10 ether group, or a sulfonyl group. In addition, for example, $R^3$ to $R^{10}$ may each independently be hydrogen, a substituted or unsubstituted C1 to C20 alkyl group, a substituted or unsubstituted C6 to C20 aryl group, a substituted or unsubstituted C1 to C10 alkoxy group, a halogen (F, Cl, Br, or I), a hydroxy group, a nitro group, a cyano group, an amine group, or a thiol group.

The phenazine-based compound represented by Chemical Formula 2 may include, for example 5,10-dihydro-5,10-dimethylphenazine; 1-fluoro-5,10-dihydro-5,10-dimethylphenazine; 2,7-difluoro-5,10-dihydro-5,10-dimethylphenazine; 1-methyl-5,10-dihydro-5,10-dimethylphenazine; 5,10-dihydro-5-methyl-10-(2,2,2-trifluoromethyl)phenazine; 5,10-bis-(2-methoxyethyl)-5,10-dihydrophenazine; or a combination thereof.

In the positive active material layer, the binder serves to well adhere the positive active materials to each other and also to well attach the positive active material to the positive electrode current collector. Examples thereof may include polyvinyl alcohol, carboxymethyl cellulose, hydroxypropyl cellulose, diacetyl cellulose, cellulose acetate, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, polyacrylic acid, an epoxy resin, nylon, but are not limited thereto.

The conductive material is used to impart conductivity to the positive electrode, and any electronically conductive material may be used without causing a chemical change in the configured battery. The conductive material may be, for example, natural graphite, artificial graphite, carbon black, acetylene black, Ketjen black, a carbon fiber, carbon nanotubes, a metal powder or a metal fiber of copper, nickel, aluminum, silver, or the like, a polyphenylene derivative, or an isophthalic acid derivative, which may be used alone or as a mixture of two or more thereof.

The current collector of the positive electrode may be an aluminum foil, stainless steel foil, titanium foil, or the like, but is not limited thereto.

Negative Electrode

The negative electrode includes a current collector and a negative active material layer disposed on the current collector. The negative active material layer includes a negative active material and may optionally further include a binder and a conductive material.

In an embodiment, the negative active material may be any general negative electrode material used in a battery and is not particularly limited. For example, the negative active material may be various metals or a material capable of intercalating and deintercalating charge carrier ions.

The negative active material may be, for example, a zinc metal-based, aluminum metal-based, copper metal-based, carbon-based, or sulfur-based material, or a combination thereof.

The zinc metal-based material may be, for example, a zinc metal, a zinc metal-based alloy, or a zinc-containing compound. The zinc metal-based alloy may include, for example, a species or two or more species of lithium, sodium, potassium, rubidium, cesium, francium, magnesium, aluminum, silicon, calcium, nickel, manganese, copper, iron, bismuth, indium, or tin in addition to zinc and the zinc-containing compound may include, for example, an oxide, a carbide, a sulfide, or a phosphate including zinc. In this case, the aqueous rechargeable battery may be referred to as a zinc aqueous rechargeable battery or an organic positive active material-zinc aqueous rechargeable battery system.

The aluminum metal-based material may be, for example, an aluminum metal, an aluminum metal-based alloy, or an aluminum-containing compound. The aluminum metal-based alloy may include, for example, a species or two or more species of lithium, sodium, potassium, rubidium, cesium, francium, magnesium, silicon, calcium, nickel, manganese, copper, zinc, iron, bismuth, indium, or tin in addition to aluminum, and the aluminum-containing compound may include, for example, an oxide, a carbide, a sulfide, or a phosphate including aluminum.

The copper metal-based material may be, for example, a copper metal, a copper metal-based alloy, or a copper-containing compound. The copper metal-based alloy may include, for example, a species or two or more species of lithium, sodium, potassium, rubidium, cesium, francium, magnesium, aluminum, silicon, calcium, nickel, manganese, zinc, iron, bismuth, indium, or tin in addition to copper, and the copper-containing compound may be, for example, an oxide, a carbide, a sulfide, or a phosphate including copper.

The carbon-based material is a general carbon-based negative active material, and may be crystalline carbon, amorphous carbon, or a combination thereof. The crystalline carbon may include, for example, natural graphite, artificial graphite, or a combination thereof, and the amorphous carbon may include soft carbon, hard carbon, a mesophase pitch carbonized product, calcined coke, or a combination thereof.

The sulfur-based material may include a general sulfur-based negative active material, and may be a sulfur-carbon composite ($C_{2x}S_y$; $0 \le x \le 2$ and $1 \le y \le 40$), or an organic sulfur-based active material. The organic sulfur-based active material may include, for example, sulfur-modified polyacrylronitrile, a sulfur-modified elastomer compound, a sulfur-modified polynuclear aromatic ring compound, a sulfur-modified pitch compound, a polythienoacene compound, a sulfur-modified polyether compound, a sulfur-modified polyamide compound, a sulfur-modified aliphatic hydrocarbon oxide, polycarbon sulfide, etc.

In the negative electrode, the binder may serve to well adhere the negative active materials to each other, or to attach the negative active materials to the negative current collector. The binder may include, for example, polyvinyl alcohol, carboxylmethyl cellulose, hydroxypropyl cellulose, diacetyl cellulose, cellulose acetate, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, polyacrylic acid, an epoxy resin, nylon, or the like, but is not limited thereto.

The conductive material is used to impart conductivity to the negative electrode, and any electronically conductive material may be used without causing a chemical change in the configured battery. The conductive material may include, for example, natural graphite, artificial graphite, carbon black, acetylene black, Ketjen black, a carbon fiber, carbon nanotube (CNT), or a metal powder or metal fiber of copper, nickel, aluminum, silver, or the like, a polyphenylene derivative, or an isophthalic acid derivative, which may be used alone or as a mixture of two or more thereof.

The current collector of the negative electrode may be an aluminum foil, a copper foil, a nickel foil, a stainless-steel foil, a titanium foil, a nickel foam, a copper foam, a polymer substrate coated with a conductive metal, or the like, but is not limited thereto.

Electrolyte

The electrolyte according to an embodiment is not a non-aqueous electrolyte, that is, an organic electrolyte used in a conventional rechargeable battery, but is an aqueous electrolyte using water or the like as a solvent. The present inventors analyzed an electrolyte suitable for an organic positive active material through the computer deep learning, and based on this, through various experiments, succeeded in designing an electrolyte into which the organic positive active material is not actually dissolved for an extended time to maintain a stable structure. This will be described in detail later in comparative examples, examples, and evaluation examples.

The aqueous electrolyte, according to an embodiment, includes a water solvent and a metal salt.

In an embodiment, a high concentration aqueous electrolyte may be used. The molality of the aqueous electrolyte is greater than or equal to about 10 m (mol/kg) and may be, for example, about 10 m to about 40 m, about 11 m to about 40 m, about 12 m to about 40 m, about 13 m to about 35 m, about 14 m to about 30 m, about 15 m to about 25 m, or about 10 m to about 20 m. In this way, when the aqueous electrolyte is included at a high concentration, first, the decomposition of water in a solvent is suppressed, second, as the high concentration electrolyte needs a reduced amount of a free solvent, the solubility of the organic positive active material is lowered, and third, since a reaction voltage of the organic positive active material is lowered, stability of oxidation/reduction increases and thus may further be suppressed from dissolution into the electrolyte during the reaction. Accordingly, an aqueous rechargeable battery manufactured by applying this high concentration aqueous electrolyte according to an embodiment may be driven at both low and high rates for a very long time without capacity deterioration and realize excellent long cycle-life characteristics.

The metal salt may be used without limitation as long as it is used in the electrolyte of a battery and may include, for example, a compound represented by Chemical Formula 11.

[Chemical Formula 11]

AxDy

In Chemical Formula 11, A is at least one metal ion of a lithium ion, a sodium ion, a potassium ion, a rubidium ion, a magnesium ion, a calcium ion, a strontium ion, a barium ion, a copper ion, a zinc ion, or an aluminum ion as a cation. D is at least one atomic group ion of $Cl^-$, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^-$, $AsF_6^-$, $SbF_6^-$, $BF_4^-$, or $PO_2F_2^-$ as an anion, $0<x\leq 2$, and $0<y\leq 2$.

In Chemical Formula 11, D may be, for example, $Cl^-$, $NO_3^-$, $ClO_4^-$, $CF_3SO_3^-$, $C_4F_9SO_3^-$, $(CF_3SO_2)_2N^-$, or combination thereof. Anions such as $Cl^-$, $NO_3^-$, and $ClO_4$ are advantageous in that they have high solubility in water and low ion size, and thus have a fast reaction kinetic with the organic positive active material including a compound represented by Chemical Formula 1. Anions such as $CF_3SO_3^-$, $C_4F_9SO_3^-$, $(CF_3SO_2)_2N^-$, and the like may also be dissolved in water as a high concentration, and the organic positive active material according to the embodiment may increase the reaction potential due to reacting with these bulky anions, thereby obtaining an energy increase effect.

In an embodiment, one type of metal salt may be used, or two or more types of metal salts may be mixed and used.

For example, the metal salt may include a compound represented by Chemical Formula 12 and a compound represented by Chemical Formula 13. Herein, the negative active material may include the metal of $A^{13}$ of Chemical Formula 13.

[Chemical Formula 12]

$$A^{12}{}_xD^{12}{}_y$$

In Chemical Formula 12, $A^{12}$ is at least one metal ion of a lithium ion, a sodium ion, a potassium ion, a rubidium ion, a magnesium ion, a calcium ion, a strontium ion, or a barium ion, $D^{12}$ is at least one atomic group ion of $Cl^-$, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^-$, $AsF_6^-$, $SbF_6^-$, $BF_4^-$, or $PO_2F_2^-$, $0<x\leq 2$, and $0<y\leq 2$.

[Chemical Formula 13]

$$A^{13}{}_xD^{13}{}_y$$

In Chemical Formula 13, $A^{13}$ is at least one metal ion of a copper ion, a zinc ion, and an aluminum ion, $D^{13}$ is at least one atomic group ion of $Cl^-$, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^-$, $AsF_6^-$, $SbF_6^-$, $BF_4^-$, or $PO_2F_2^-$, $0<x\leq 2$, and $0<y\leq 2$.

In Chemical Formula 12, $D^{12}$ may be, for example, $Cl^-$, $NO_3^-$, $ClO_4^-$, $CF_3SO_3^-$, $C_4F_9SO_3^-$, or $(CF_3SO_2)_2N^-$. In Chemical Formula 13, $D^{13}$ may be, for example, $Cl^-$, $NO_3^-$, $ClO_4^-$, $CF_3SO_3^-$, $C_4F_9SO_3^-$, or $(CF_3SO_2)_2N^-$. These anions have advantages of high solubility in water, high reaction kinetic with the p-type organic positive active material, or increasing the reaction voltage of the active material.

When the metal salt includes the compound represented by Chemical Formula 12 and the compound represented by Chemical Formula 13, for example, the molality of the compound represented by Chemical Formula 1 in the electrolyte may be about 10 m to about 40 m, about 13 m to about 35 m, or about 15 m to about 30 m, and molality of the compound represented by Chemical Formula 2 in the electrolyte may be about 0.1 m to about 5 m, about 0.1 m to about 3 m, about 0.1 m to about 2 m, or about 0.1 m to about 1 m. In this case, the aqueous rechargeable battery may implement excellent cycle-life characteristics.

Separator

The separator is a separator for preventing physical contact between the positive electrode and the negative electrode. The separator has a structure with fine pores so that charge carrier ions may move. Any separators may be used as long as they are commonly used in aqueous rechargeable batteries. That is, a separator with a low resistance of ion movement in an aqueous electrolyte and excellent electrolyte wettability may be used as the separator.

Examples of the separator may include glass fiber, polyester, Teflon, polyolefin, cellulose (cellulose or cellulose acetate), or a combination thereof, and the polyolefin may include, for example, polyethylene, polypropylene, polytetrafluoroethylene, or a combination thereof. The separator may be in the form of a nonwoven fabric or a woven fabric. For example, a polyolefin-based polymer separator such as polyethylene or polypropylene may be used as a separator, mainly applied to aqueous rechargeable batteries. A separator coated with a ceramic component or a polymer material may also be used to secure heat resistance or mechanical strength. The separator may optionally be used as a single-layer or multi-layer structure.

In an embodiment, an ion exchange membrane may be used as the separator. The ion exchange membrane may separate the positive and negative electrode but selectively transmits ions and may include, for example, an anion exchange membrane, a cation exchange membrane, an amphoteric ion exchange membrane, etc. Any structure of such an ion exchange membrane may be used, and a commercially available product may be applied. When an ion separation membrane is used according to an embodiment, it can be expected to not only improve general battery performance but also effectively inhibit ions of the organic positive active material from being dissolved into the electrolyte to pass to the opposite electrode.

Hereinafter, examples of the present invention and comparative examples are described. The following examples are only examples of the present invention, and the present invention is not limited to the following examples.

Comparative Example 1: Instability in Organic Solvents

A positive electrode composition was prepared by mixing a dimethylphenazine (DMPZ; 5,10-dihydro-5,10-dimethylphenazine) positive active material, carbon black, and a polytetrafluoroethylene (PTFE) binder in a weight ratio of 4:4:2 and then compressing it in a stainless-steel grid, preparing a positive electrode. The positive electrode, a separator, and a Na metal negative electrode were stacked and then housed into a case, and then an electrolyte prepared by dissolving a 1 M $NaClO_4$ metal salt in tetraethylene glycol dimethyl ether (TEGDME) as an organic solvent was injected into the case, preparing a rechargeable battery cell of Comparative Example 1.

The rechargeable battery cell of Comparative Example 1 was charged and discharged for 15 cycles at a 1 C rate, and the results are shown in FIG. 1. Referring to FIG. 1, the cell exhibited severely decreased capacity after 15 cycles. Redox active organic active materials such as DMPZ and the like had high solubility in an organic solvent used as an electrolyte for a rechargeable battery. Thus, they had the disadvantage of being dissolved and disappearing during the driving of the rechargeable battery cell, deteriorating long-term performance, and exhibiting low cycle characteristics and stability.

Figure 2:
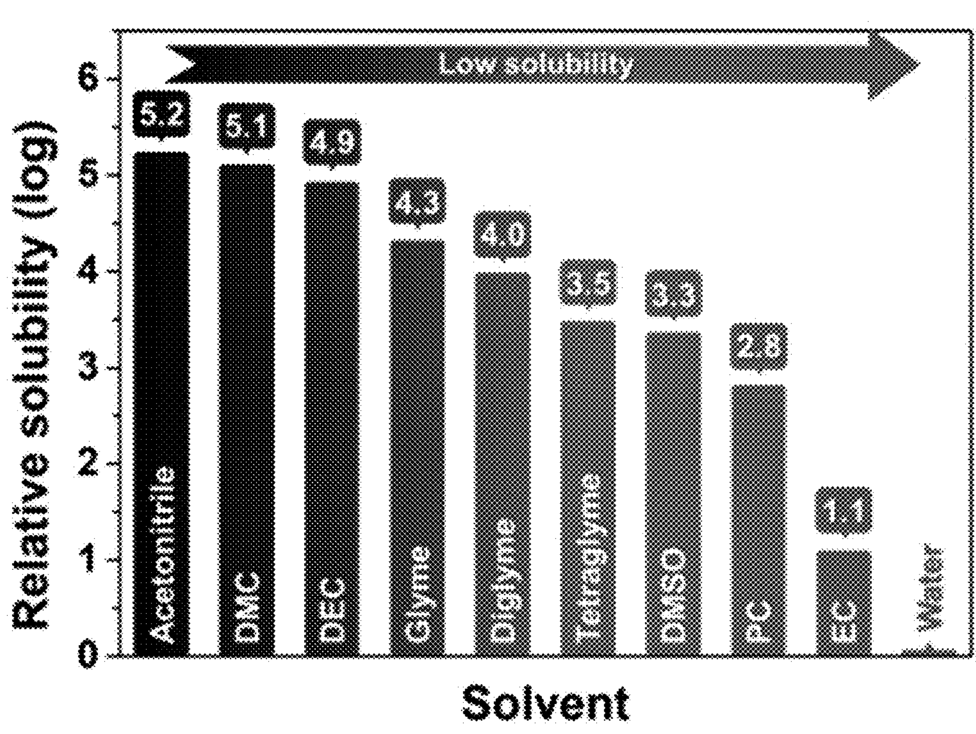
FIG. 2 is a graph predicting the solubility of dimethylphenazine (DMPZ) in various solvents through computer deep learning.

Accordingly, the solubility of DMPZ in various solvents was predicted through computer deep learning, and the results are shown in FIG. 2. In FIG. 2, for example, solubility in an acetonitrile solvent was $10^{5.2}$ times as high as solubility in water. Referring to FIG. 2, the solubility of DMPZ in water was predicted to be significantly lower than those in the other organic solvents.

Figure 3:
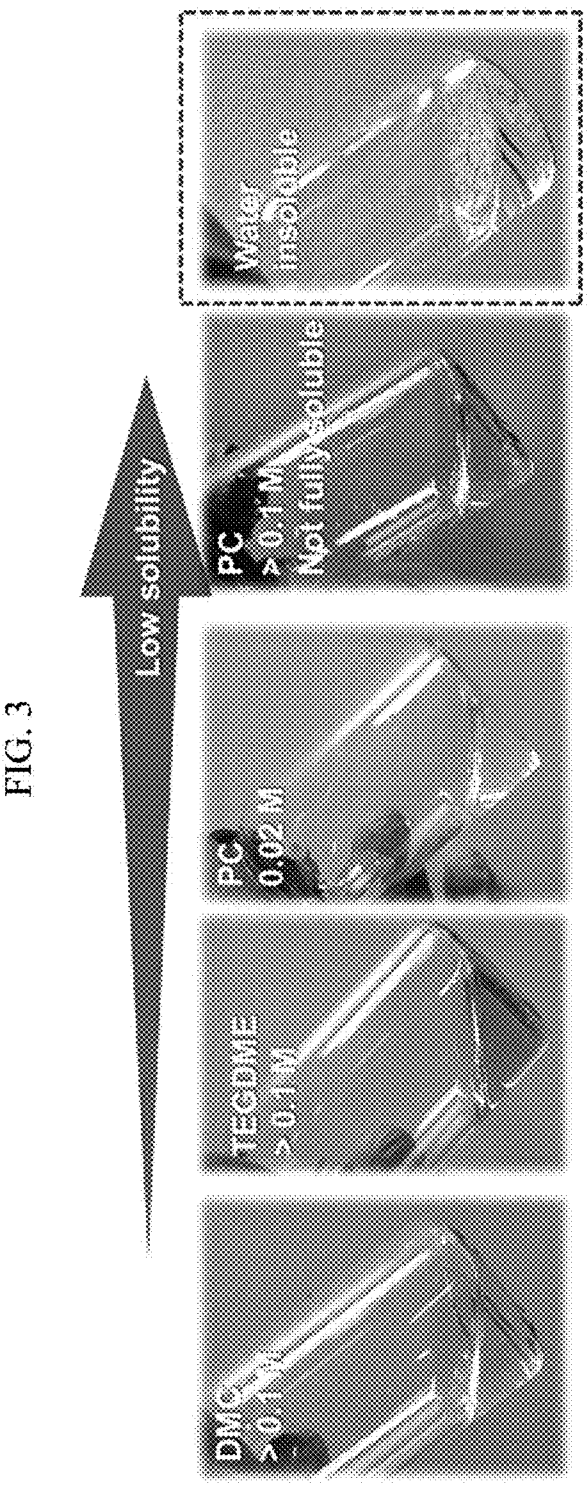
FIG. 3 is a result of visually observing the solubilities of DMPZ in various solvents.

These prediction results were confirmed by actual experiments, and the results are shown in FIG. 3. DMPZ was respectively dissolved in various solvents, and color changes in the solutions were examined with the naked eye to evaluate dissolution degrees. Referring to FIG. 3, DMPZ was easily dissolved at a high concentration of 0.1 M or more in dimethyl carbonate (DMC) and tetraethylene glycol dimethyl ether (TEGDME) and a concentration of 0.02 M or so in propylene carbonate (PC) but not dissolved in the water solvent at all. This result was consistent with the analysis result through deep learning.

Example 1: Application of Aqueous Electrolyte

Since DMPZ turned out to not be dissolved in water, the water was tentatively determined as an optimal electrolyte, conducting the following evaluations. The same positive electrode as Comparative Example 1, that is, a positive electrode using the DMPZ positive active material, was prepared. The positive electrode, an anion separator, a Zn metal negative electrode, and an aqueous electrolyte prepared by dissolving 1 m of $NaClO_4$ and 0.5 m of $Zn(CF_3SO_3)_2$ in water were used to manufacture a battery cell of Example 1.

Evaluation Example 1

Figure 4:
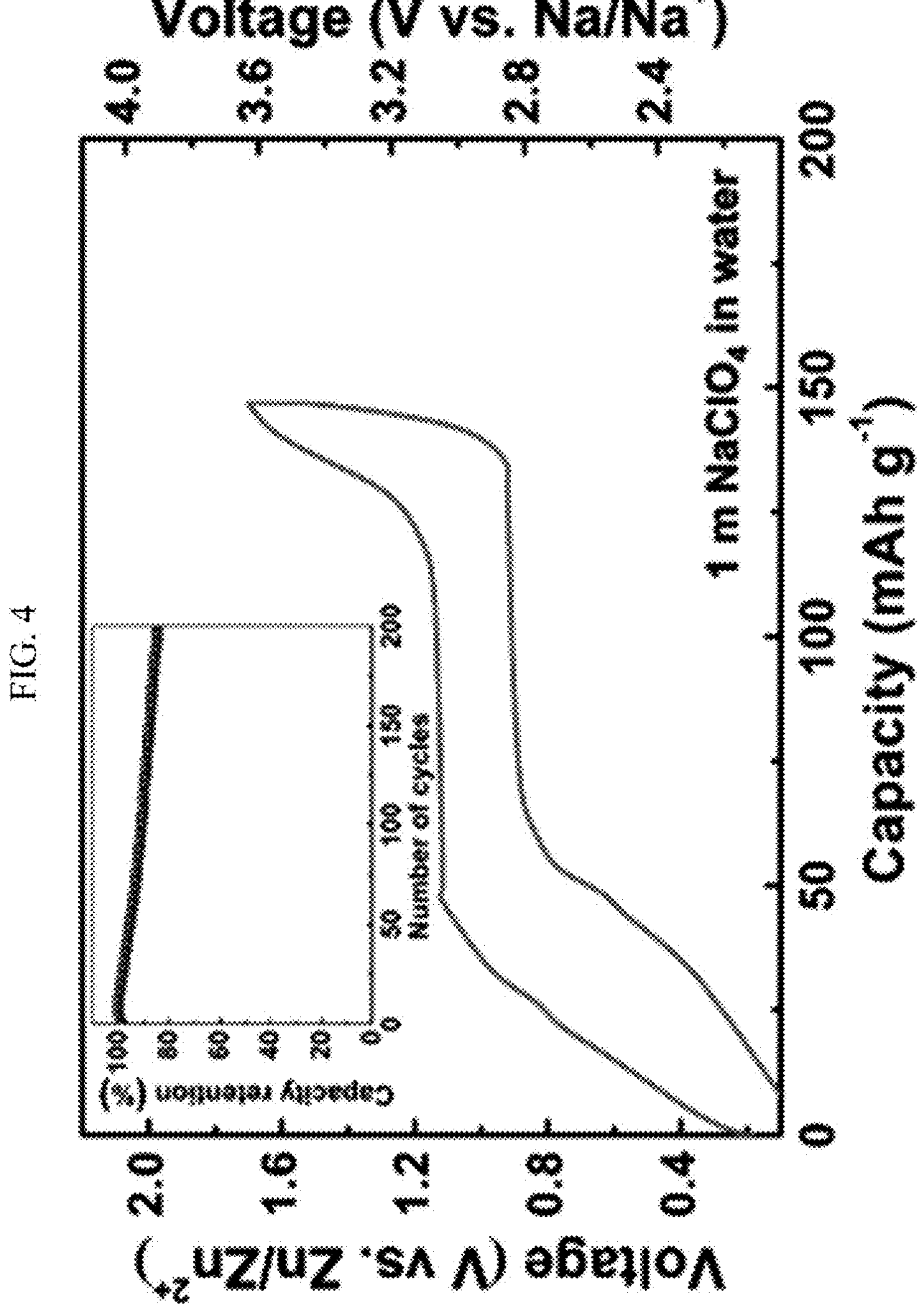
FIGS. 4 and 5 are graphs illustrating the evaluation of charge/discharge characteristics of the rechargeable battery cell of Example 1.

FIG. 4 is a constant current charge and discharge curve of the battery cell of Example 1 when cycled at 1 C in a voltage range of 0.1 V to 1.7 V (vs. $Zn/Zn^{2+}$). The voltage range was set to have an upper limit of 1.7 V in order to avoid an oxygen evolution reaction (OER) and stably operate DMPZ. Referring to FIG. 4, a stable reversible redox reaction turned out to proceed in the aqueous electrolyte, unlike an organic electrolyte. In addition, referring to FIG. 4, the cell exhibited a capacity of about 136 mAh/g at the first discharge and capacity retention of about 85% at 200 cycles. The decreased solubility of DMPZ contributed to successfully improving the stability of battery cycles.

However, the cell exhibited a voltage stabilization period at 1.1 V alone, which means that a single (first) electron reaction of DMPZ alone occurred because the upper limit was designed to be 1.7 V, where the second electron redox reaction did not sufficiently occur.

Figure 5:
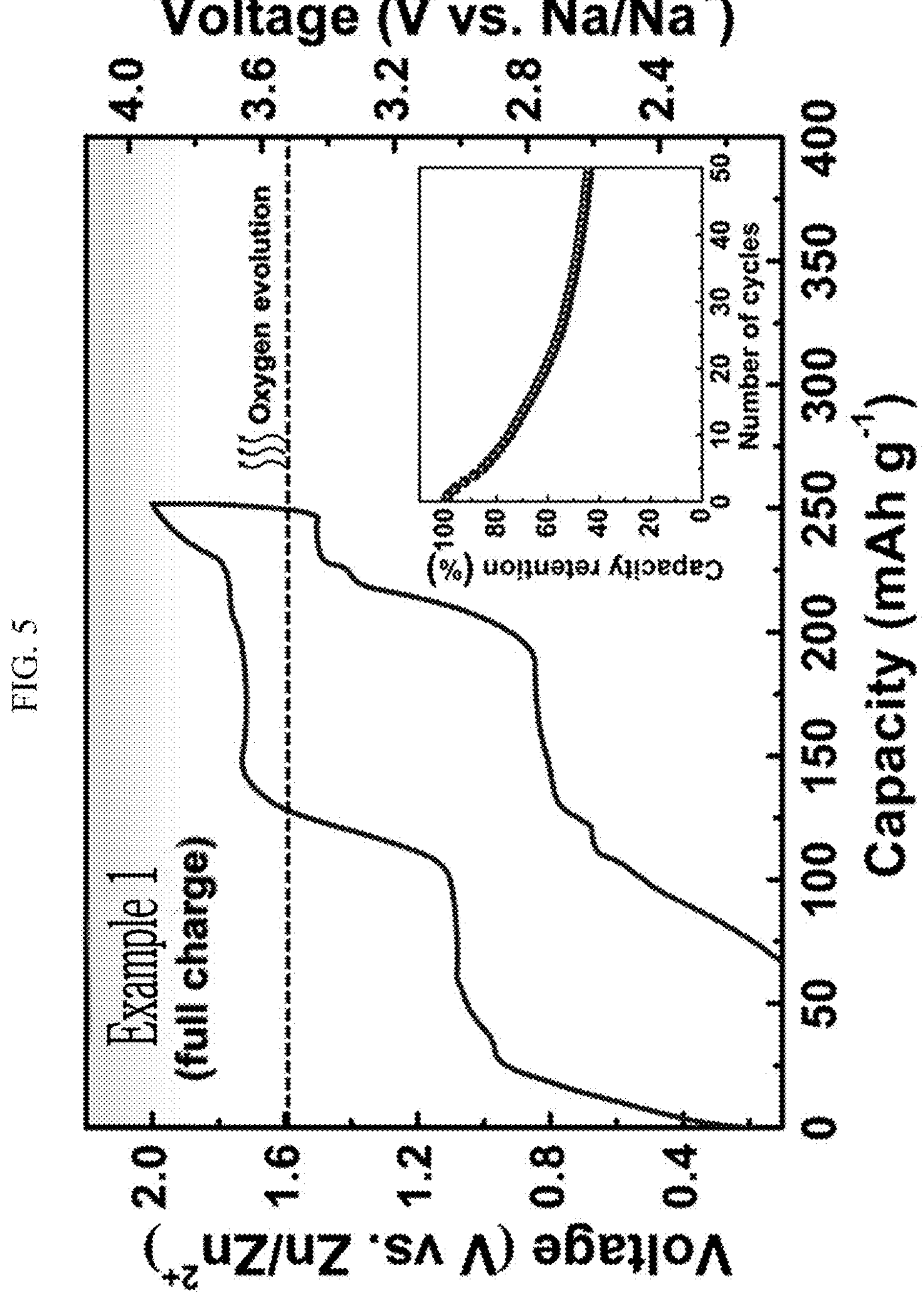

On the other hand, the cycles were performed by changing the voltage range from 0.1 V to 2.0 V so that a second electron reaction of DMPZ occurred, which the results are shown in FIG. 5. Referring to FIG. 5, the cell realized the capacity of about 254 mAh/g near to theoretical capacity at the first charge and exhibited two voltage stabilization periods at 1.1 V and 1.72 V. However, when increased to 1.8 V or more where a water decomposition reaction and the like can be reduced, capacity deteriorated at 50 cycles or more. In other words, due to a high reaction voltage of DMPZ in the $DMPZ^{2+}$ reaction, the second electron reaction, since a water decomposition reaction occurred, or a portion of $DMPZ^{2+}$ was dissolved out, cycle-life characteristics slightly deteriorated.

Example 2: Application of High-Concentration Aqueous Electrolyte

A positive electrode composition was prepared by mixing a DMPZ positive active material, carbon black, and a polytetrafluoroethylene (PTFE) binder in a weight ratio of 4:4:2 and compressed in a stainless steel grid, preparing a positive electrode. The positive electrode, an anion separator, and a Zn metal negative electrode were staked and inserted into a case, and an aqueous electrolyte prepared with 17 m of $NaClO_4$ and 0.5 m of $Zn(CF_3SO_3)_2$ in water was injected into the case, preparing a rechargeable battery cell of Example 2. This cell was a DMPZ-Zn rechargeable battery cell manufactured by introducing a high concentration electrolyte.

Evaluation Example 2: Charge and Discharge Characteristics

Figure 6:
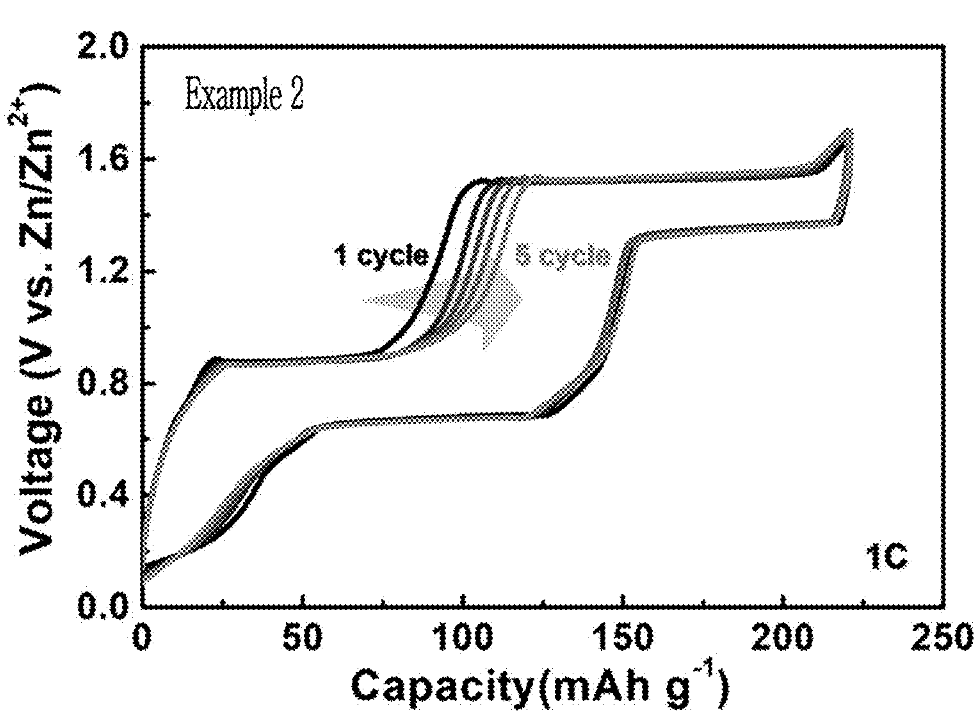
FIG. 6 is a graph illustrating the evaluation of charge/discharge characteristics of the rechargeable battery cell of Example 2.

The cell of Example 2 was charged and discharged for 5 cycles, and the results are shown in FIG. 6. Referring to FIG. 6, two voltage stabilization periods appeared, exhibiting both a $DMPZ^+$ reaction and a $DMPZ^{2+}$ reaction, but the cell maintained a stable charged and discharged state during the cycles, securing capacity near theoretical capacity. The stable cycles were obtained by first, an effect that the high concentration electrolyte itself suppressed water decomposition, second, an effect that an amount of a free solvent in the high concentration electrolyte was reduced, which lowered solubility of the organic positive active material and thus prevented the additional dissolution of DMPZ ions in the electrolyte, and third, an effect that a reaction voltage of the DMPZ was lowered, which increased stability of the oxidation/reduction reaction and thus had cycle stability.

Figure 7:
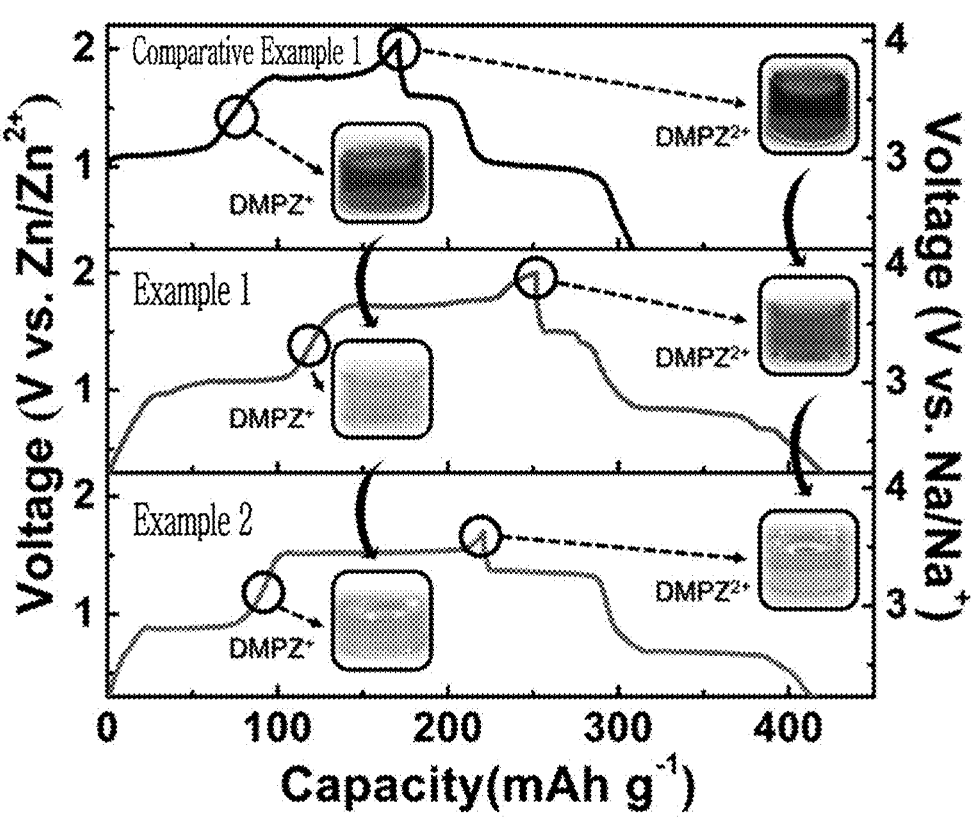
FIG. 7 is a result of the evaluation of electrolyte solubilities for the positive active materials during charging of the rechargeable battery cells of Comparative Example 1, Example 1, and Example 2.

Evaluation Example 3: Analysis of Solubility of Positive Active Material During Cycle Each cell of Comparative Example 1 and Examples 1 and 2 was checked regarding how much the positive active materials were dissolved when the electrodes were taken out during the charge and washed with a new electrolyte, and the results are shown in FIG. 7. FIG. 7 shows charge and discharge profiles of the cells of Comparative Example 1 and Examples 1 and 2, wherein arrow parts indicate SOC (stage of charge) of 50 and 100, which respectively correspond to $DMPZ^+$ and $DMPZ^{2+}$. In the top graph of FIG. 7, the cell of Comparative Example 1 using an organic electrolyte exhibited an irreversible charge and discharge behavior and relatively low capacity, and the electrolyte was green at SOC 50 ($DMPZ^+$) and dark green at SOC 100 ($DMPZ^{2+}$). Accordingly, the positive active material, including both $DMPZ^+$ and $DMPZ^{2+}$ (up to DMPZ that are not charged) was analyzed to exhibit high solubility in the electrolyte during the cycles.

The middle graph of FIG. 7 shows the cell of Example 1 using an aqueous electrolyte at a low concentration, wherein the electrolyte was light yellow in $DMPZ^+$ and light green in $DMPZ^{2+}$, and accordingly, although DMPZ itself had very low solubility in water, charged DMPZs were thought to be slightly dissolved in the water during the cycles. Nevertheless, the color changes were weak, compared with those of Comparative Example 1.

In the bottom graph showing the cell of Example 2 prepared by applying a high concentration aqueous electrolyte, the electrolyte maintained transparent all $DMPZ^+$ and $DMPZ^{2+}$. Accordingly, in the high concentration aqueous electrolyte system of Example 2, $DMPZ^+$ and $DMPZ^{2+}$ (including DMPZ) were not dissolved at all, which exhibited very low solubility of the positive active material in the electrolyte.

Figure 8:
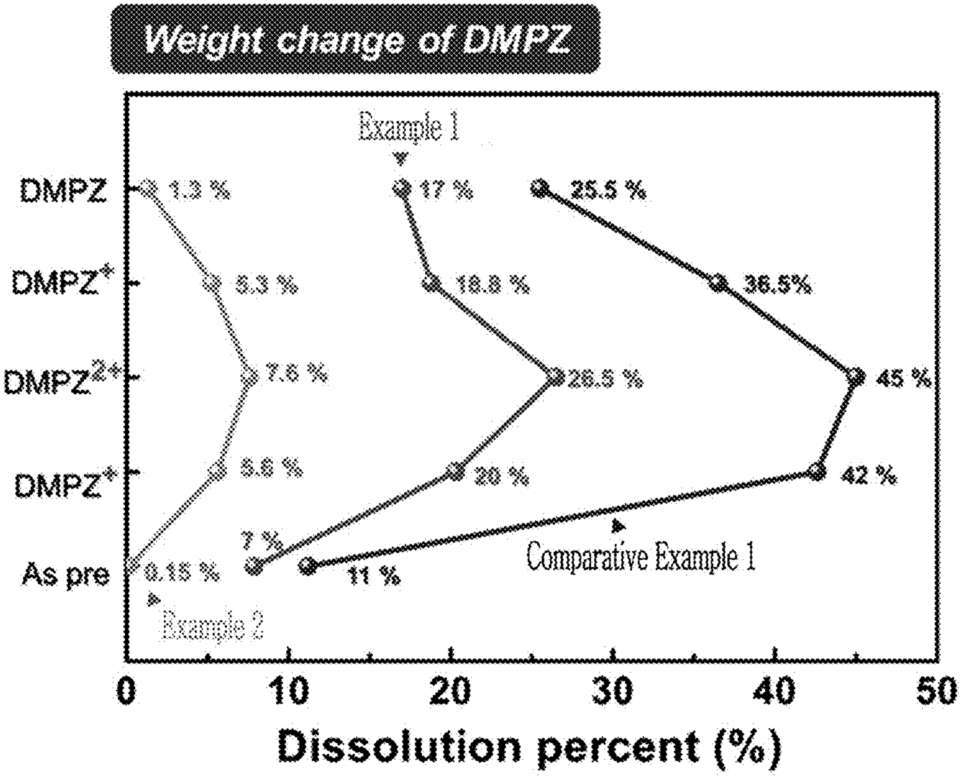
FIG. 8 is a graph quantitatively analyzing amounts of DMPZ dissolved in each electrolyte of Comparative Example 1, Example 1, and Example 2.

FIG. 8 is a graph quantitatively analyzing amounts of DMPZ dissolved in each electrolyte of Comparative Example 1 and Examples 1 and 2. The cycled DMPZ electrode was re-wetted in the electrolyte, and ultraviolet (UV)-visible ray spectroscopy was performed with respect to solutions in each of the $DMPZ^+$ and $DMPZ^{2+}$ states to measure areas of an absorption spectrum and thus obtain each amount of $DMPZ^+$ and $DMPZ^{2+}$ dissolved out in the electrolyte. In FIG. 8, a vertical axis indicates the DMPZ state according to SOC, while a horizontal axis indicates a weight change as solubility (%). In FIG. 8, Comparative Example 1 is shown on the right, Example 1 is in the middle, and Example 2 is on the left. Referring to FIG. 8, from right to left, Comparative Example 1, Example 1, and Example 2 exhibited decreased solubility of DMPZ and DMPZ ions.

Evaluation Example 4: Rate Capability

Figure 9:
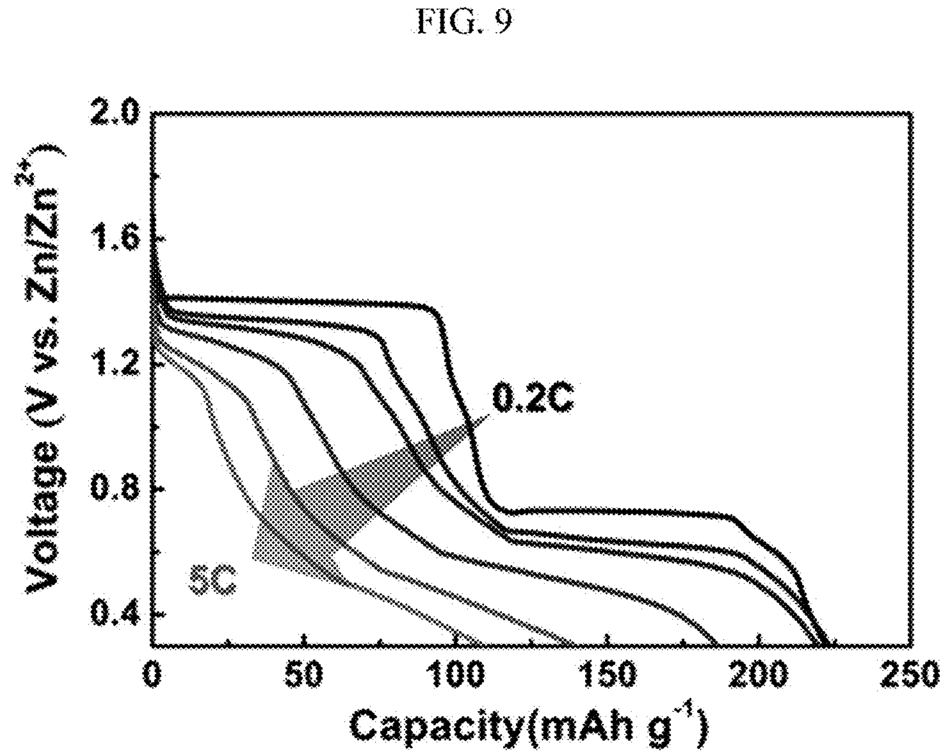
FIG. 9 is a graph analyzing capacity differences when charging and discharging the battery cell of Example 2 at 0.2C, 0.5C, 1C, 2C, 4C, and 5C.
Figure 10:
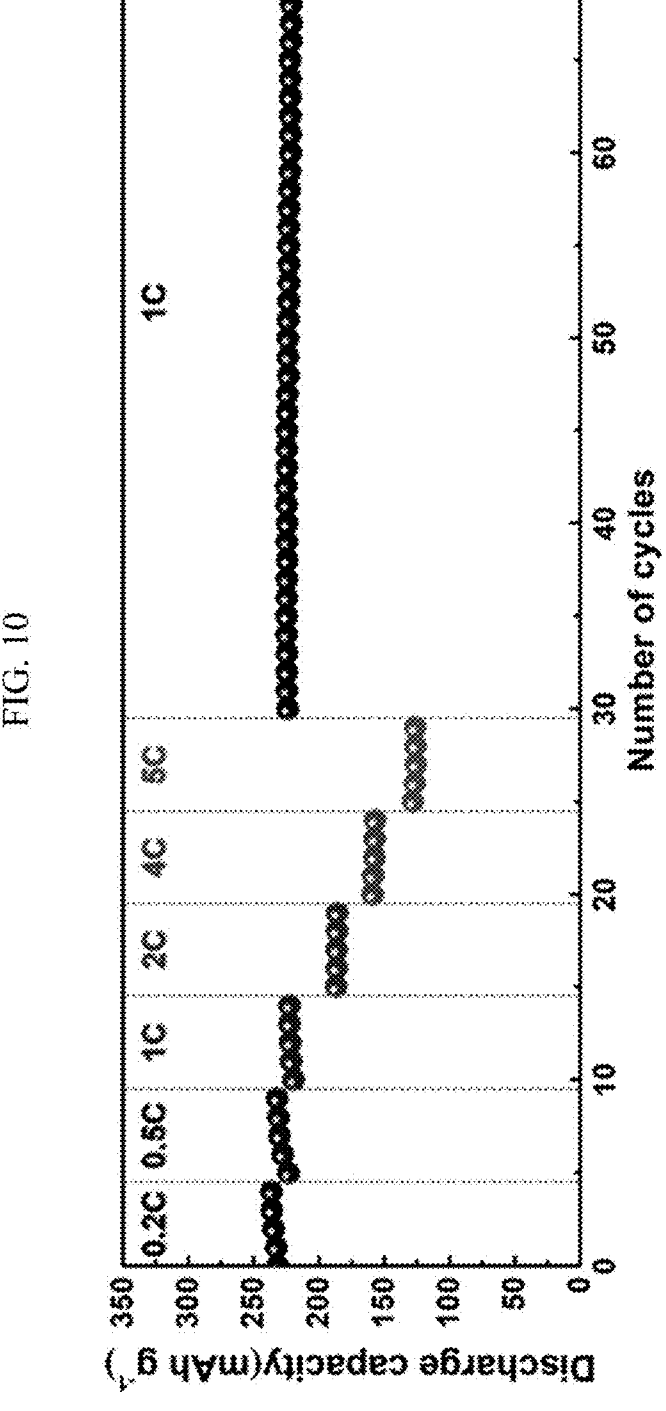
FIG. 10 is a graph evaluating the discharge capacities of the battery cell of Example 2 when the charge/discharge cycle is continued at 0.2C, 0.5C, 1C, 2C, 4C, and 5C.

The cell of Example 2 was charged and discharged at 0.2 C, 0.5 C, 1 C, 2 C, 4 C, and 5 C, and the results are shown in FIGS. 9 and 10. Referring to FIGS. 9 and 10, the cell exhibited excellent rate capability within the entire range of 0.2 C to 5 C, and charges and discharges were all possible at a slow charge and discharge rate to a high charge and discharge rate. This excellent rate capability was understood to be caused due to high ion conductivity of 100 mS/cm of the electrolyte.

Evaluation Example 5: High-Rate Cycle-Life Characteristics

Figure 11:
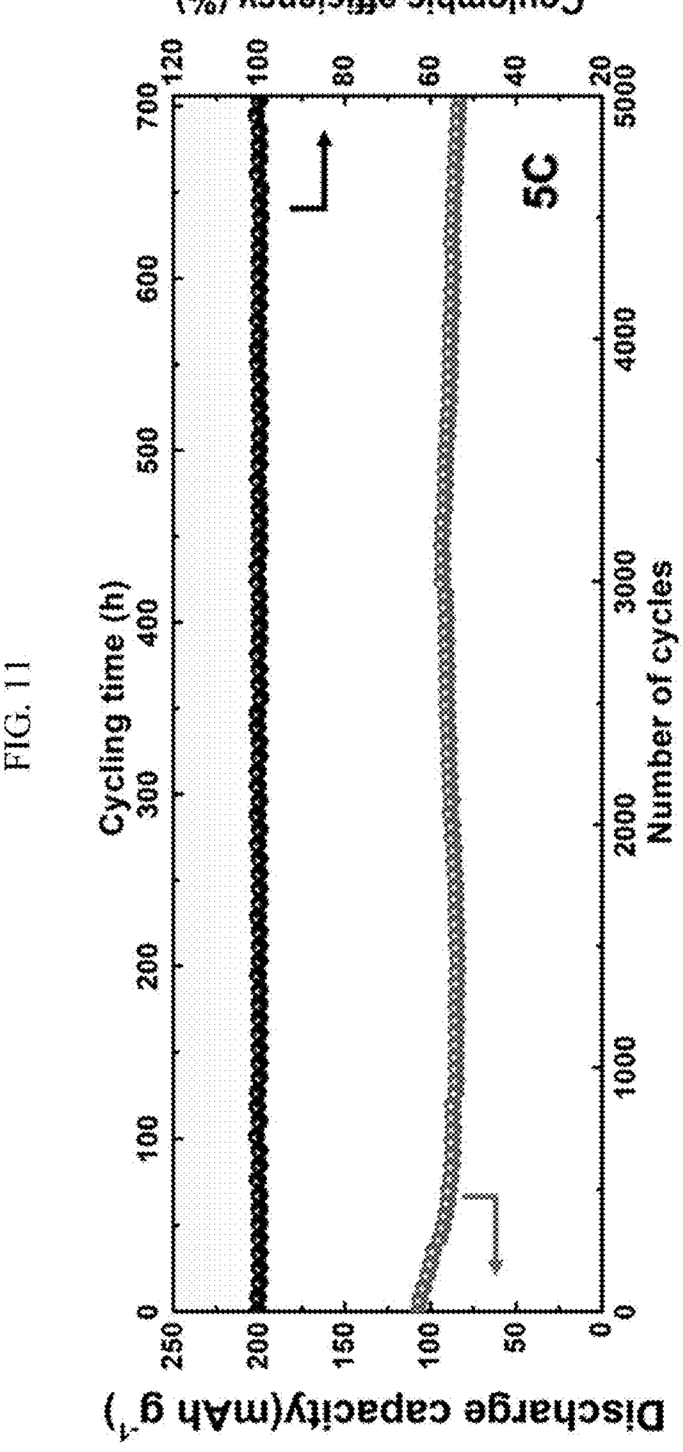
FIG. 11 is a graph evaluating discharge capacity and coulombic efficiency when 5000 cycles are performed at a 5C rate for the battery cell of Example 2.

Furthermore, cycle-life characteristics for a long time at various current ratios were evaluated. First, the cell of Example 2 was 5000 cycles (about 700 hours) performed at a fast rate of 5 C and then evaluated with respect to long-term cycle-life characteristics, and the results are shown in FIG. 11. Referring to FIG. 11, the cell of Example 2 was very stably driven at a high rate and exhibited excellent long-term cycle-life characteristics.

Evaluation Example 6: Low-Rate Cycle-Life Characteristics

Figure 12:
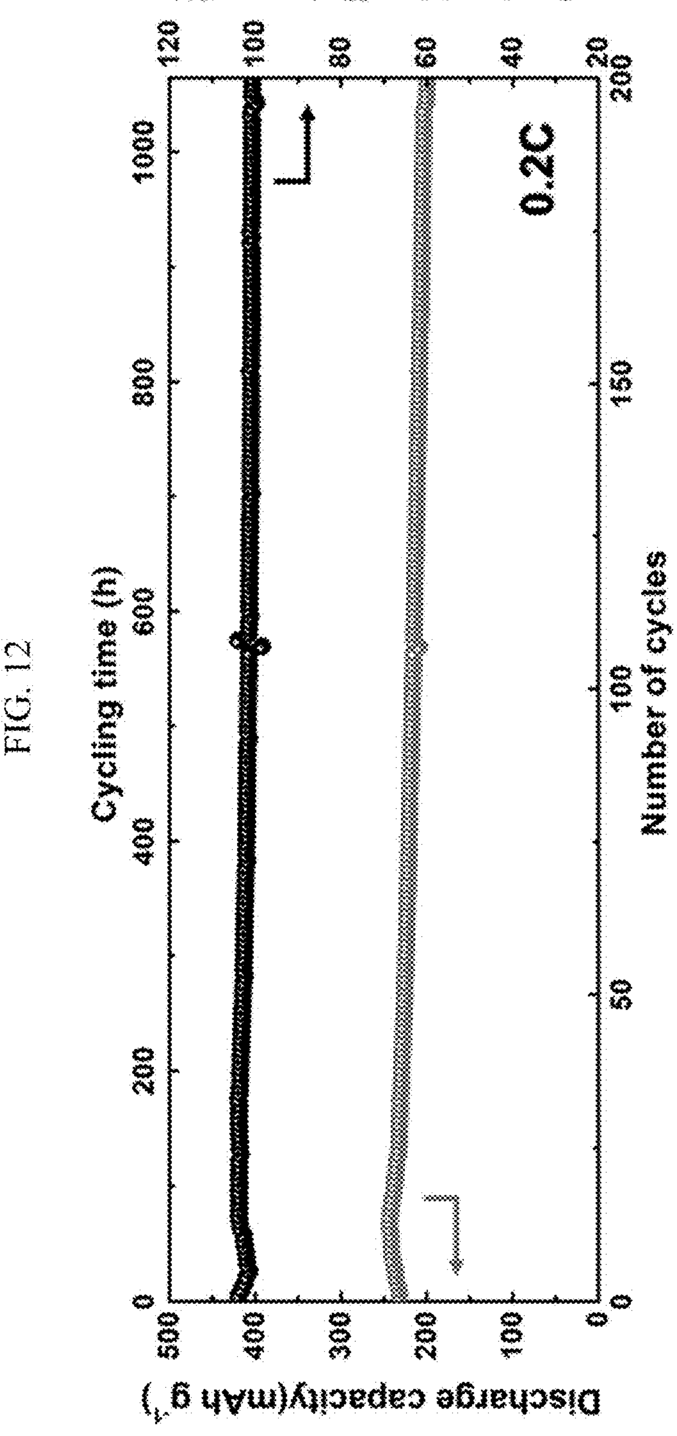
FIG. 12 is a graph evaluating discharge capacity and coulombic efficiency of the battery cell of Example 2 when the cycles are performed at a rate of 0.2C for 1000 hours or more.

The cell of Example 2 was charged and discharged at a slow rate of 0.2 C for 1000 hours or more and then evaluated with respect to low-rate long-term cycle-life characteristics, and the results are shown in FIG. 12. In the conventional battery field using an organic positive active material, since the active material was dissolved in the electrolyte, cycle characteristics at a fast charge and discharge rate were generally demonstrated without realizing long cycle-life characteristics at a low rate. In practice, a cell should be safely well driven without deteriorating capacity for a long time rather than the number of cycles and even at a low rate for a long time. Referring to FIG. 12, the cell of Example 2 exhibited an initial capacity of 231 mAh/g at a low rate of 0.2 C and capacity retention of 87% for 1000 hours or more (200 cycles or more), thus very excellent low-rate long-term cycle-life characteristics.

Evaluation Example 7: 1C Long Cycle-Life Characteristics

Figure 13:
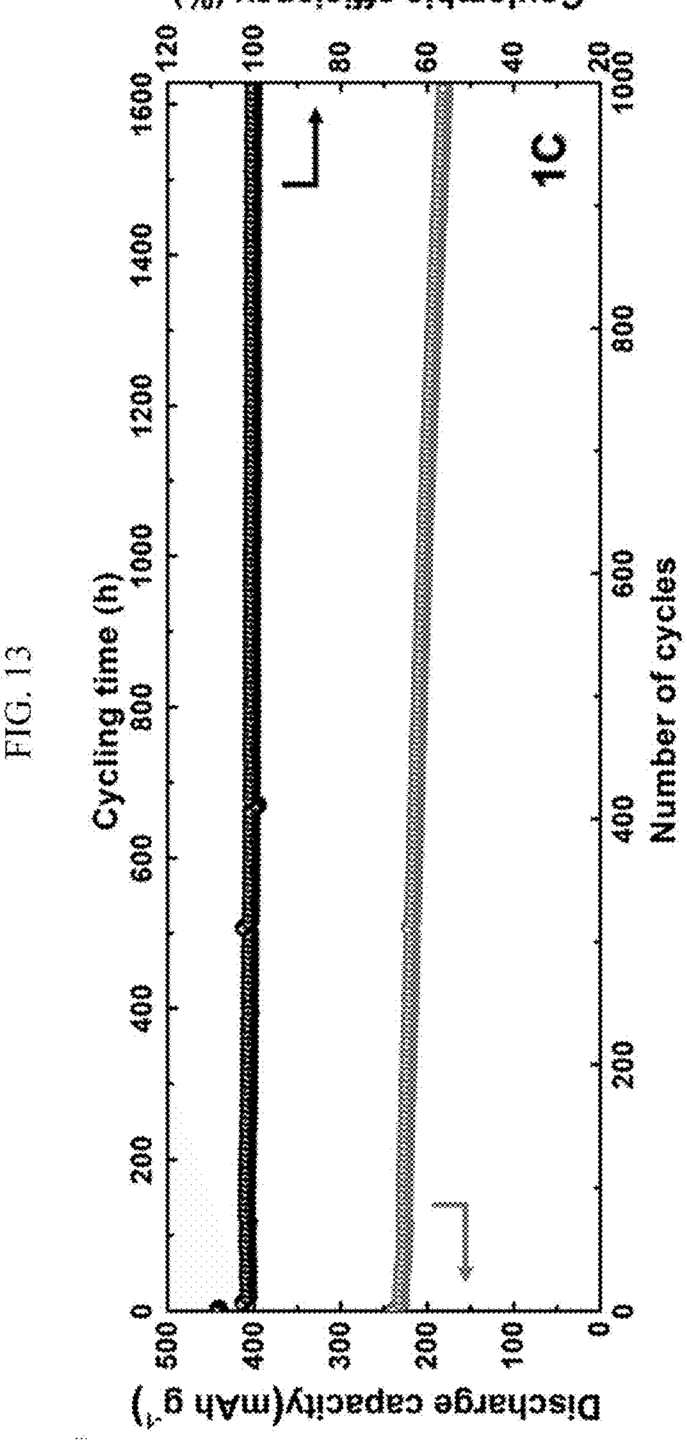
FIG. 13 is a graph evaluating discharge capacity and coulombic efficiency of the battery cell of Example 2 when the cycles are performed at a 1C rate for 1600 hours or more.

The cell of Example 2 was charged and discharged at a 1 C rate for a long time of 1600 hours or more, and the results are shown in FIG. 13. Referring to FIG. 13, the cell of Example 2 exhibited an initial capacity of a 221 mAh/g at the 1 C rate and capacity retention of 81% or more for 1600 hours or more, that is, 1000 cycles in terms of the cycle number.

Evaluation Example 8: Comparison with Battery Cells to which Other Organic Positive Active Materials are Applied FIG. 14 is a graph briefly comparing the performance of conventional rechargeable battery cells composed of various organic positive active materials and a Zn negative electrode, which have been reported in articles and the like, and the rechargeable battery cell according to an embodiment, for example, comparing energy density, cycle degradation rate per day, and battery operational life.

Herein, the energy density was based on initial discharge capacity and derived as a product of the initial discharge capacity ($C_{initial}$) and an average discharge voltage ($V_{avg}$). The battery operational life has not been well described in the conventional literature. Still, it has been calculated through parameters such as cumulative discharge capacity of total cycles, current rates, the number of cycles, and the like, which have been described in the literature. Specifically, the battery operational life (unit: hour) was obtained by dividing a sum of the initial discharge capacity ($C_{initial}$) and final discharge capacity ($C_{final}$) by 2 and multiplying the number of cycles (N) to obtain the cumulative discharge capacity ($C_{cumulative}$) of total cycles and then dividing it by a current rate (j). The cycle degradation rate per day was an index indicating cycle degradation with respect to a time parameter and calculated by using the initial discharge capacity ($C_{initial}$), the final discharge capacity ($C_{final}$), and the battery operational life according to Calculation Equation 1.

$$\frac{\left(\frac{c_{initial} - c_{final}}{c_{initial}} \times 100\right)}{\text{Battery operational life} \times \frac{1}{24}}$$ [Calculation Equation 1]

Figure 14:
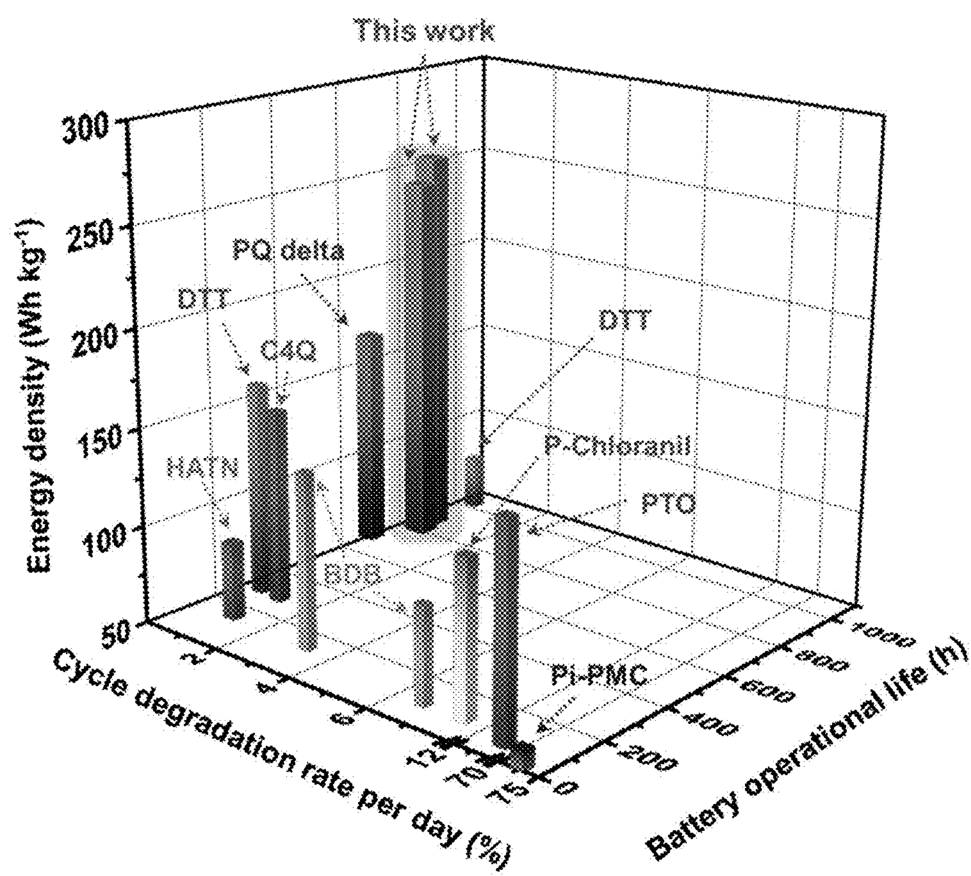
FIG. 14 is a graph comparing the performance of conventional rechargeable battery cells composed of various organic positive active materials and a Zn negative electrode and the rechargeable battery cell according to the example.

In FIG. 14, "This work" indicates the battery cell using the DMPZ positive active material according to Example 2. Counterclockwise from this, PQ delta is a battery cell applying a trigonal phenanthrenequinone-based macrocycle as a positive active material, and DTT is a battery cell applying dibenzo[b,i]thianthrene-5,7,12,14-tetraone, C4Q is a battery cell applying cailx[4]quinone, HATN is a battery cell applying diquinoxalino[2,3-a:2',3'-c]phenazine, BDB is a battery cell applying 1,4-bis(diphenylamino)benzene, P-Chloranil is a battery cell applying P-chloranil, PTO is a battery cell applying pyrene-4,5,9,10-tetraone, and Pi-PMC is a battery cell applying 3,4,9,10-perylenetetracarboxylic dianhydride as a positive active material.

Referring to FIG. 14, the battery cell, according to an embodiment, turned out to be significantly superior to the conventional organic battery cells not only in energy density but also in durability based on time, such as a cycle degradation rate and the battery operational life. There were no conventional battery cells realizing energy density of greater than 200 Wh/kg and battery operational life of greater than 800 hours. The cell, according to an embodiment, realized long term cycle-life characteristics as well as a high energy density of 250 Wh/kg.

Figure 15:
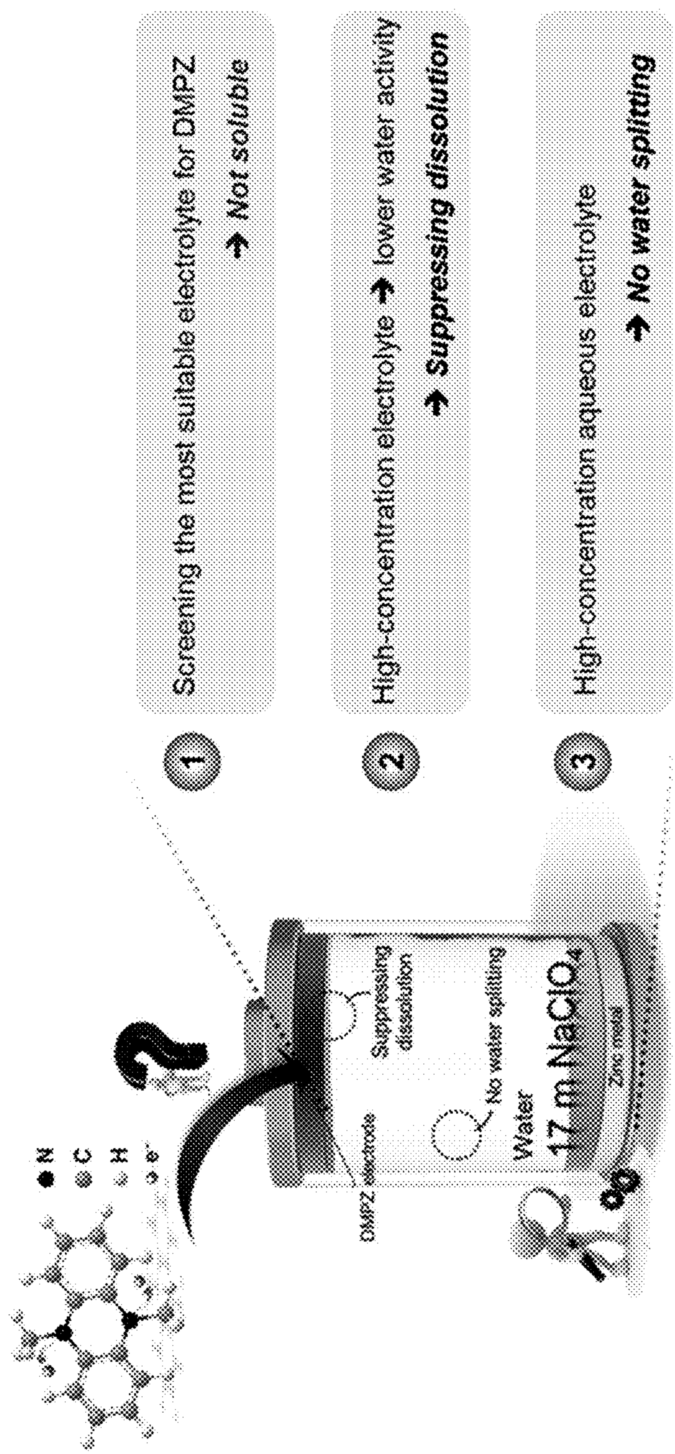
FIG. 15 is a diagram schematically illustrating a design of a battery according to an embodiment.

FIG. 15 is a diagram schematically illustrating a design of a battery according to an embodiment. The present inventors have succeeded in designing an electrolyte suitable for an organic positive active material through computer deep learning and various experiments and furthermore adjusting a concentration of the electrolyte to suppress the further dissolution of the organic positive active material in the electrolyte, and also suppresses decomposition of water, and accordingly, realizing a rechargeable battery cell stably driven at high and low rates for a long time without deteriorating capacity.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An aqueous rechargeable ion battery, comprising:

a positive electrode including an organic positive active material including a compound represented by Chemical Formula 1;

a negative electrode;

a separator between the positive electrode and negative electrode; and an aqueous electrolyte including a water solvent and a metal salt with a molality of greater than or equal to about 15 m, wherein an amount of organic positive active material dissolved in the aqueous electrolyte, as measured by the area of the absorption spectrum in a UV-visible spectroscopic analysis of the aqueous electrolyte, is less than or equal to 7.6 wt % based on a total of 100 wt % of the aqueous electrolyte and the organic positive electrode active material:

[Chemical Formula 1]

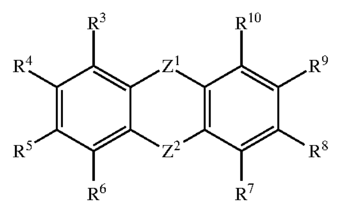

wherein, in Chemical Formula 1, $Z^1$ and $Z^2$ are the same as or different from each other, $Z^1$ is $NR^1$, $PR^1$, O, S, S=O, or $S(=O)_2$, and $Z^2$ is $NR^2$, $PR^2$, O, S, S=O, or $S(=O)_2$, $R^1$ and $R^2$ are the same as or different from each other and are each independently a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, an ester group, a carboxyl group or a salt thereof, a sulfonic acid group or a salt thereof, or a phosphoric acid group or a salt thereof, and $R^3$ to $R^{10}$ are the same as or different from each other and are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, an ester group, a carboxyl group or a salt thereof, a sulfonic acid group or a salt thereof, or a phosphoric acid group or a salt thereof.

2. The aqueous rechargeable ion battery of claim 1, wherein in Chemical Formula 1, $Z^1$ is $NR^1$, and $Z^2$ is $NR^2$, $PR^2$, O, S, S═O, or $S(═O)_2$.

3. The aqueous rechargeable ion battery of claim 1, wherein in Chemical Formula 1, $Z^1$ is S, and $Z^2$ is $NR^2$, $PR^2$, O, S, S═O, or $S(═O)_2$.

4. The aqueous rechargeable ion battery of claim 1, wherein the compound represented by Chemical Formula 1 includes a phenazine-based compound, a phenoxazine-based compound, a phenothiazine-based compound, a thianthrene-based compound, a thianthrene 5-oxide-based compound, or a thianthrene 5,5-dioxide-based compound.

5. The aqueous rechargeable ion battery of claim 1, wherein in Chemical Formula 1, $R^1$ and $R^2$ are each independently a halogen-substituted C1 to C10 alkyl group, an unsubstituted C1 to C10 alkyl group, a halogen-substituted C6 to C20 aryl group, an unsubstituted C6 to C20 aryl group, a substituted or unsubstituted C2 to C10 ether group, or a sulfonyl group, and $R^3$ to $R^{10}$ are each independently hydrogen, a substituted or unsubstituted C1 to C20 alkyl group, a substituted or unsubstituted C6 to C20 aryl group, a substituted or unsubstituted C1 to C10 alkoxy group, a halogen, a hydroxy group, a nitro group, a cyano group, an amine group, or a thiol group.

6. The aqueous rechargeable ion battery of claim 1, wherein the compound represented by Chemical Formula 1 is a phenazine-based compound represented by Chemical Formula 2:

[Chemical Formula 2]

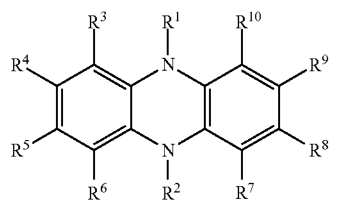

wherein, in Chemical Formula 2, $R^1$ and $R^2$ are the same as or different from each other and are each independently a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C20 alkoxy group, a substituted or unsubstituted C2 to C20 ether group, a halogen (F, Cl, Br, or I), a hydroxy group, a nitro group, a cyano group, an amine group, an imino group, an azido group, a carbonyl group, a thiol group, a sulfonyl group, an ester group, a carboxyl group or a salt thereof, a sulfonic acid group or a salt thereof, or a phosphoric acid group or a salt thereof, and $R^3$ to $R^{10}$ are the same as or different from each other and are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C3 to C20 heteroaryl group, a substituted or unsubstituted C1 to C10 alkoxy group, a halogen (F, Cl, Br, or I), a hydroxy group, a nitro group, a cyano group, an amine group, an imino group, an azido group, a carbonyl group, a thiol group, a sulfonyl group, an ester group, an ether group, a carboxyl group or a salt thereof, a sulfonic acid group or a salt thereof, or a phosphoric acid group or a salt thereof.

7. The aqueous rechargeable ion battery of claim 6, wherein in Chemical Formula 2, $R^1$ and $R^2$ are each independently a halogen-substituted C1 to C10 alkyl group, an unsubstituted C1 to C10 alkyl group, a halogen-substituted C6 to C20 aryl group, an unsubstituted C6 to C20 aryl group, a substituted or unsubstituted C2 to C10 ether group, or a sulfonyl group, and $R^3$ to $R^{10}$ are each independently hydrogen, a substituted or unsubstituted C1 to C20 alkyl group, a substituted or unsubstituted C6 to C20 aryl group, a substituted or unsubstituted C1 to C10 alkoxy group, a halogen, a hydroxy group, a nitro group, a cyano group, an amine group, or a thiol group.

8. The aqueous rechargeable ion battery of claim 6, wherein the phenazine-based compound represented by Chemical Formula 2 includes 5,10-dihydro-5, 10-dimethylphenazine; 1-fluoro-5,10-dihydro-5, 10-dimethylphe- nazine; 2,7-difluoro-5, 10-dihydro-5, 10-dimethylphenazine; 1-methyl-5, 10-dihydro-5,10-dimethylphenazine; 5,10-dihydro-5-methyl-10-(2,2,2-trifluoromethyl) phenazine; or 5,10-bis-(2-methoxyethyl)-5, 10-dihydrophenazine.

9. The aqueous rechargeable ion battery of claim 1, wherein the negative electrode includes a negative active material, and the negative active material includes a zinc metal-based, an aluminum metal-based, a copper metal-based, a carbon-based, or a sulfur-based material, or a combination thereof.

10. The aqueous rechargeable ion battery of claim 1, wherein molality of the aqueous electrolyte is about 15 m to about 40 m.

11. The aqueous rechargeable ion battery of claim 1, wherein molality of the aqueous electrolyte is about 15 m to about 35 m.

12. The aqueous rechargeable ion battery of claim 1, wherein the metal salt of the aqueous electrolyte includes a compound represented by Chemical Formula 11:

[Chemical Formula 11]

AxDy wherein, in Chemical Formula 11,

A is at least one metal ion of a lithium ion, a sodium ion, a potassium ion, a rubidium ion, a magnesium ion, a calcium ion, a strontium ion, a barium ion, a copper ion, a zinc ion, or an aluminum ion as a cation, D is at least one atomic group ion of $Cl^-$, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^-$, $AsF_6^-$, $SbF_6^-$, $BF_4^-$, or $PO_2F_2^-$ as an anion, $0<x\leq2$, and $0<y\leq2$.

13. The aqueous rechargeable ion battery of claim 12, in Chemical Formula 11, D is $Cl^-$, $NO_3^-$, $ClO_4^-$, $CF_3SO_3^-$, $C_4F_9SO_3^-$, $(CF_3SO_2)_2N^-$, or combination thereof.

14. The aqueous rechargeable ion battery of claim 1, wherein in the aqueous electrolyte, the metal salt includes a compound represented by Chemical Formula 12 and a compound represented by Chemical Formula 13:

[Chemical Formula 12]

$A^{12}{}_xD^{12}{}_y$ wherein, in Chemical Formula 12, $A^{12}$ is at least one metal ion of a lithium ion, a sodium ion, a potassium ion, a rubidium ion, a magnesium ion, a calcium ion, a strontium ion, or a barium ion, $D^{12}$ is at least one atomic group ion of $Cl^-$, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^-$, $AsF_6^-$, $SbF_6^-$, $BF_4^-$, or $PO_2F_2^-$, $0<x\leq2$, and $0<y\leq2$, and

[Chemical Formula 13]

$A^{13}{}_xD^{13}{}_y$ wherein, in Chemical Formula 13, $A^{13}$ is at least one metal ion of a copper ion, a zinc ion, and an aluminum ion, $D^{13}$ is at least one atomic group ion of Cl–, $SO_4^{2-}$, $NO_3^-$, $ClO_4^-$, $SCN^-$, $CF_3SO_3^-$, $C_4F_9SO_3^-$, $(CF_3SO_2)_2N^-$, $AlO_2^-$, $AlCl_4^-$, $AsF_6^-$, $SbF_6^-$, $BF_4^-$, or $PO_2F_2^-$, $0<x\leq2$, and $0<y\leq2$.

15. The aqueous rechargeable ion battery of claim 14, wherein molality of the compound represented by Chemical Formula 12 is about 10 m to about 40 m, and molality of the compound represented by Chemical Formula 13 is about 0.1 m to about 5 m.

16. The aqueous rechargeable ion battery of claim 14, wherein the negative electrode includes a negative active material including the metal of $A^{13}$ of Chemical Formula 13.

17. The aqueous rechargeable ion battery of claim 1, wherein the separator is an ion exchange membrane.

18. The aqueous rechargeable ion battery of claim 1, wherein molality of the aqueous electrolyte is about 15 m to about 25 m.

* * * * *